United States Patent
Sato et al.

(10) Patent No.: US 7,207,784 B2
(45) Date of Patent: Apr. 24, 2007

(54) HYBRID COMPRESSOR AND CONTROL DEVICE

(75) Inventors: Kimihiko Sato, Handa (JP); Nobuhiro Miura, Anjo (JP); Yasutane Hijikata, Nagoya (JP); Masato Komura, Kariya (JP)

(73) Assignee: Denso Corporation, Kariya (JP)

( * ) Notice: Subject to any disclaimer, the term of this patent is extended or adjusted under 35 U.S.C. 154(b) by 359 days.

(21) Appl. No.: 10/614,895

(22) Filed: Jul. 9, 2003

(65) Prior Publication Data

US 2004/0009073 A1 Jan. 15, 2004

(30) Foreign Application Priority Data

Jul. 12, 2002 (JP) ............................. 2002-203758

(51) Int. Cl.
F04B 1/26 (2006.01)
(52) U.S. Cl. .................. 417/222.2; 62/175; 417/222.1
(58) Field of Classification Search ............ 417/222.1, 417/222.2; 62/228.4, 228.1, 230
See application file for complete search history.

(56) References Cited

U.S. PATENT DOCUMENTS

| | | | | |
|---|---|---|---|---|
| 5,867,996 A | * | 2/1999 | Takano et al. ................. 62/175 |
| 6,230,507 B1 | * | 5/2001 | Ban et al. ................... 62/228.4 |
| 6,250,891 B1 | * | 6/2001 | Kawaguchi et al. ...... 417/222.2 |
| 6,619,929 B2 | * | 9/2003 | Adaniya et al. ............ 417/223 |
| 2001/0027658 A1 | * | 10/2001 | Ota et al. ................... 62/228.3 |

FOREIGN PATENT DOCUMENTS

JP A-H10-291415 11/1998

* cited by examiner

Primary Examiner—Ehud Gartenberg
Assistant Examiner—Vikansha Dwivedi
(74) Attorney, Agent, or Firm—Posz Law Group, PLC

(57) ABSTRACT

When a hybrid compressor starts being driven by an electric motor, the electric current of a capacity control valve is applied at an initial control electric current SS that is greater than a control electric current S, which is from the state of a refrigerating circuit. This triggers a swash plate of the hybrid compressor to be rapidly inclined. Thereafter, the electric current of the displacement control valve is applied at the control electric current S. This structure enables the displacement of the hybrid compressor to rapidly recover when the hybrid compressor starts being driven by the electric motor.

26 Claims, 8 Drawing Sheets

HYBRID COMPRESSOR AND CONTROL DEVICE

CROSS REFERENCE TO RELATED APPLICATIONS

This application is based on and incorporates herein by reference Japanese Patent Application No. 2002-203758 filed on Jul. 12, 2002.

BACKGROUND OF THE INVENTION

The present invention relates to a hybrid compressor that is used mainly for a vehicular air-conditioning device and driven selectively by an engine or an electric motor, and its control device.

In a typical vehicular air-conditioning device, cooling cannot be executed when the engine driving the vehicle is stopped. Recently, vehicles have been developed that stop the engine when the vehicle is temporarily stopped. Further, in another new type of vehicle, the engine may be stopped even while the vehicle is traveling, depending on conditions. In these vehicles, a hybrid compressor is used for comfortably cooling the passenger cabin. The hybrid compressor is driven by the engine while the engine is running by an electric motor when the engine is stopped.

One hybrid compressor and its controlling method is disclosed in JP-A-2000-110734. This hybrid compressor is furnished with a compression mechanism having a rotating shaft, an electric motor having an output shaft connected with the rotating shaft, and an electromagnetic clutch connected with the output shaft. An engine is connected with the output shaft through the electromagnetic clutch. When the engine is in an operating state and the electromagnetic clutch is turned on, the driving force of the engine is transmitted through the output shaft to the rotating shaft so that the compression mechanism can be driven. By contrast, when the engine is stopped, the electromagnetic clutch is turned off, and the output shaft and the rotating shaft are disconnected from the engine, the electric motor drives the compression mechanism using the electric power of a battery.

Furthermore, in the above hybrid compressor, a swash-plate type externally variable displacement compressor is adopted. In this compressor, a piston is driven by the rotation of a swash plate, and a displacement adjusting mechanism is externally adjusted, so that a certain displacement can be obtained by varying of the inclination angle of the swash plate. In order to constantly optimize the cooling performance in a refrigerating circuit, the inclination angle of the swash plate is adjusted based on the cooling load so that the discharge displacement can be controlled.

The applicant of the present invention discloses, in JP-A-H10-291415, a method for enabling a motor of a hybrid compressor to be reduced in size and mounted on a vehicle. In this hybrid compressor, the load of the motor is set to zero when the motor is turned on. The load of the motor is then increased after rotation of the motor becomes stable.

However, in the above case, it takes an interval to return to the required displacement after the displacement is once shifted to zero. In particular, when heat capacity is low and the target cooling temperature is low, it takes a longer interval to return to the required displacement. This inhibits the air-conditioning and reduces passenger comfort for the interval.

SUMMARY OF THE INVENTION

It is an object of the present invention to provide a hybrid compressor that rapidly produces the required displacement when an electric motor starts to drive the compressor.

To achieve the above object, a hybrid compressor is controlled as follows. When a hybrid compressor starts being driven by a motor, the hybrid compressor is operated by controlling a control device for operating at a first control value to trigger a swash plate of the hybrid compressor to be rapidly inclined. The hybrid compressor is thereafter operated by controlling the control device for operating at a second control value, which is less than the first control value. This structure enables the displacement of the hybrid compressor to rapidly recover.

In one aspect of the present invention, a control device includes a capacity control valve of the hybrid compressor. The capacity control valve is operated at a first or second electric current applied to the capacity control valve as the first or second control value. The first electric current is greater than the second electric current, which is obtained from the status of the refrigerating circuit.

In another aspect of the present invention, a control device includes the electric motor. The electric motor is operated at a first or second revolution number as the first or second control value, respectively. The first revolution number is greater than the second revolution number.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
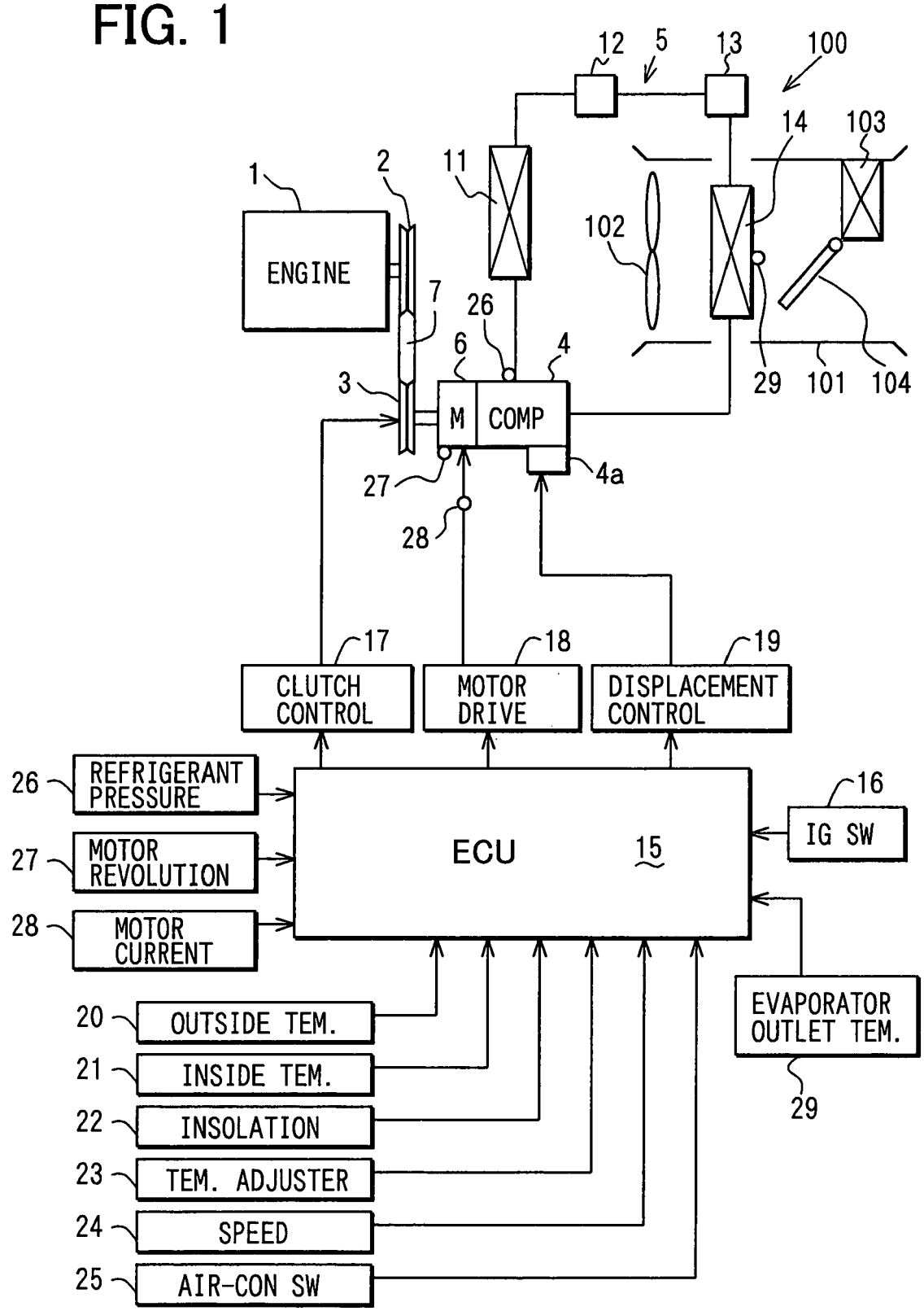
FIG. 1 is a schematic diagram showing overall structure of a vehicular air-conditioning system using a hybrid compressor according to an embodiment of the present invention.

FIG. 1 shows the overall structure of a vehicular air-conditioning system using a hybrid compressor according to an embodiment of the present invention. This embodiment is directed to a vehicle such a truck that conveys baggage. In this truck, in order to prevent an engine from continuing to be operating during the loading or unloading of baggage, the engine is turned off while the truck stops. When the cooling capacity runs short, the engine is turned on.

In FIG. 1, an engine 1 is a driving source for moving the vehicle. An output shaft of the engine 1 is connected with a driving pulley 2 that is rotated in conjunction with the driving of the engine 1. The driving pulley 2 and a known electromagnetic clutch 3, which interrupts the driving force, are connected with a transmission belt 7. When the electromagnetic clutch 3 is engaged, the engine 1 is connected with a compressor 4, which is a part of a refrigerating circuit 5, and the compressor 4 is driven by the engine 1.

The compressor 4 can be also driven by a built-in electric motor 6 (direct current (DC) motor). The electric motor 6 is driven by power supplied by an in-vehicle battery (not shown). The compressor 4 is driven selectively by either the engine 1 or the electric motor 6.

In this embodiment, when the electric motor 6 drives the compressor 4 during a stopped state of the engine 1, coordination between the engine 1 and the compressor 4 is interrupted by disengaging the electromagnetic clutch 3. The compressor 4 is then driven by the motor 6. A one-way clutch can be also used for switching the driving methods.

Figure 2:
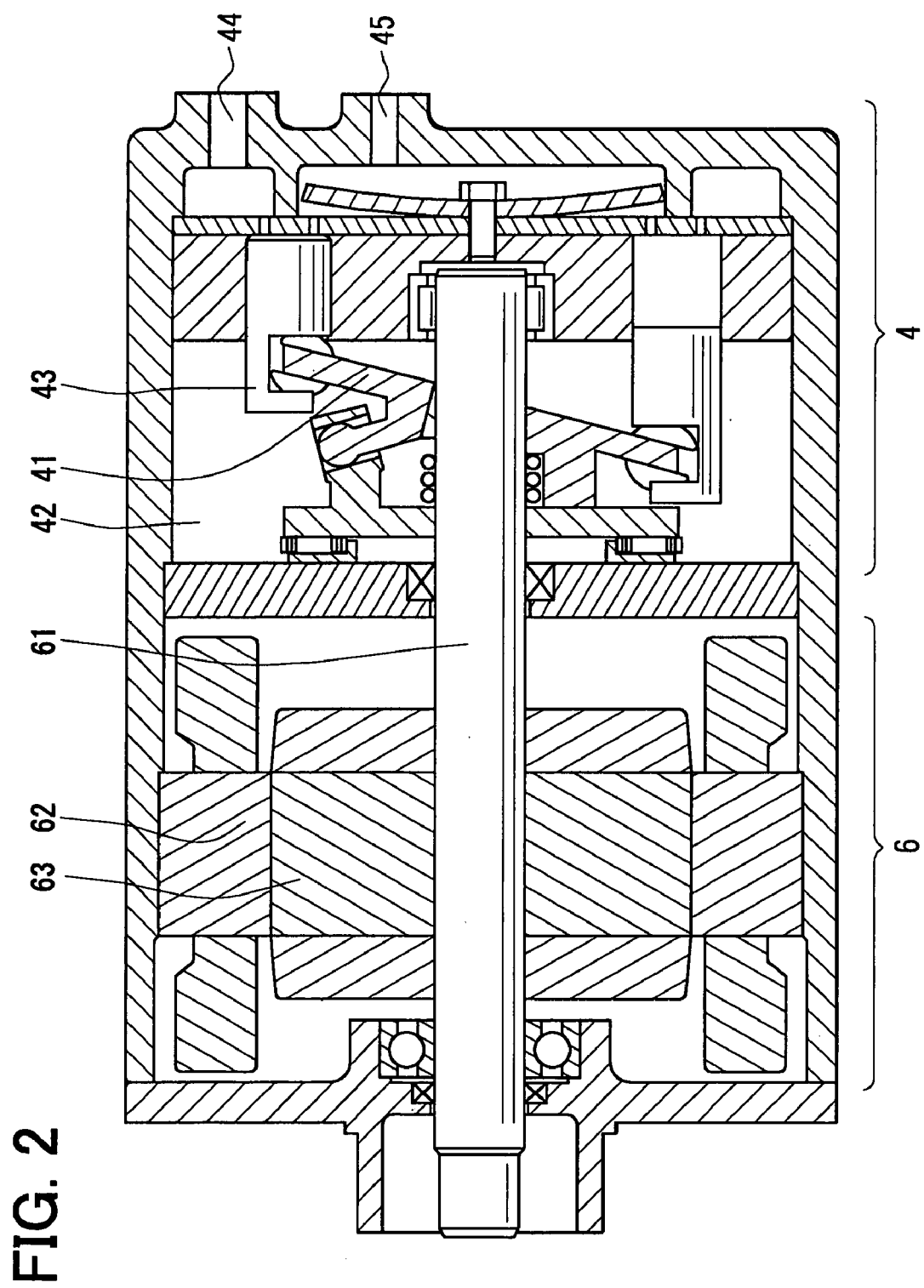
FIG. 2 is a sectional view of a swash-plate type externally variable displacement compressor according to the embodiment of FIG. 1.

The refrigerating circuit 5 will be briefly explained below. FIG. 2 shows a sectional view of a swash-plate type externally variable displacement compressor according to this embodiment. In this compressor 4, a compression mechanism such as a piston 43 is driven by rotation of a swash plate 41. The internal pressure within a swash-plate chamber 42 is adjusted to set the inclination angle of the swash plate 41. Thus, the inclination angle can be varied by an electromagnetic pressure capacity control valve (capacity control valve) 4a that is externally controlled (shown in FIG. 1). The discharge displacement is varied based on the inclination angle of the swash plate 41.

A suction port 44 is fluidly connected with an outlet of an evaporator 14, while a discharge port 45 is fluidly connected with an inlet of a condenser 11. A shaft 61 is the rotating shaft of the compressor 4 and also an output shaft of the electric motor 6. The electric motor 6 includes a stator 62 and a rotor 63, which is rotated with the stator 62. The shaft 61 is connected with the electromagnetic clutch 3 at its leftmost end in FIG. 2.

The refrigerating circuit 5 includes, as shown in FIG. 1, in addition to the compressor 4, known devices as follows: the condenser 11, in which refrigerant compressed by the compressor 4 is condensed and liquefied; a receiver 12, in which condensed and liquefied refrigerant is divided into a liquid phase and a gas phase; an expansion valve 13, at which the liquid phase of the refrigerant is expanded and decompressed; and the evaporator 14, at which the expanded refrigerant is evaporated.

The evaporator 14 is a heat exchanger for cooling of a vehicular air-conditioning system 100 through which a cabin (or passenger compartment) of the vehicle is air-conditioned. The vehicular air-conditioning system 100 includes an air-conditioning case 101, which provides an air passage to the cabin and which contains an air fan (blower) 102, the evaporator 14, a heater core 103, an air mix door 104, and the like. The heater core 103 is downstream from the evaporator 14, and the heat source of the core 103 is engine cooling water. The air mix door 104 is for adjusting the temperature of the air-conditioned air.

The electromagnetic clutch 3, the compressor 4, and the electric motor 6 are controlled by an electronic control unit (ECU) 15 as a control device. The ECU 15 is supplied with power from an in-vehicle battery (not shown) when an ignition switch (IG SW) that enables vehicle travel is turned on.

The ECU 15 is connected to various components with output terminals as follows: a clutch control circuit 17; a motor drive circuit 18; and a displacement control circuit 19. The electromagnetic clutch 3 is controlled through the clutch control circuit 17 by the ECU 15. The electric motor 6 is controlled through the motor drive circuit 18 by the ECU 15. The capacity control valve 4a of the compressor 4 is controlled through the displacement control circuit 19 by the ECU 15.

The ECU 15 is connected to various components with input terminals as follows: an outside air temperature sensor 20 for detecting air temperature outside the vehicle; an inside air temperature sensor 21 for detecting air temperature inside the cabin; an insolation sensor 22 for detecting an amount of insolation incident inside the cabin; and a temperature adjuster 23 for setting a target air temperature inside the cabin. The ECU 15 is furthermore connected with a vehicle speed sensor 24 for detecting the vehicle speed, and an air-conditioning switch (SW) 25 for enabling automatic control of the vehicular air-conditioning system 100 based on a signal from the temperature adjuster 23.

Furthermore, the ECU 15 is connected with other components with input terminals as follows: a pressure sensor 26 for detecting the refrigerant pressure in a higher pressure portion of the refrigerating circuit 5; a revolution number sensor 27 for detecting the number of revolutions of the electric motor 6; an electric current sensor 28 for detecting the electric current for driving the electric motor 6; and a temperature sensor 29 for detecting the temperature of air (at an outlet of the evaporator 14) just after the air passes through the evaporator 14. In this embodiment, only when the air-conditioning switch 25 is turned on can the compressor 4 and the blower 102 be automatically controlled.

Figure 3:
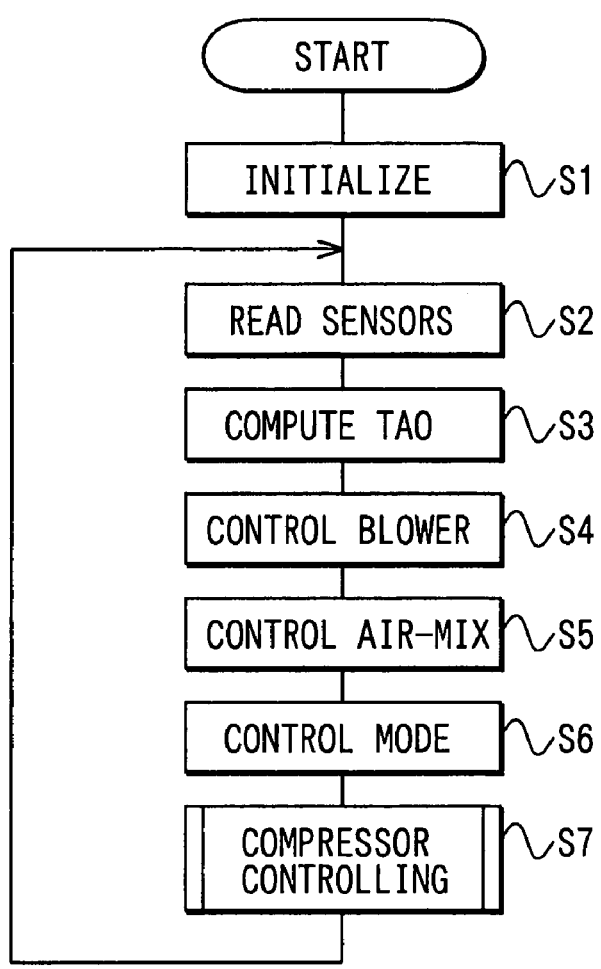
FIG. 3 is a flow diagram illustrating a main control process of an ECU used in the vehicular air-conditioning system.

The main control of the air conditioning system 100 by the ECU 15 will be explained with reference to FIG. 3.

At Step 1, stored values are initialized when automatic control of the air-conditioning system 100 is started.

At Step 2, a target temperature that is set using the temperature adjuster 23 by a passenger is read and other values such as temperatures are also read from the outside air temperature sensor 20, the inside air temperature sensor 21, the insolation sensor 22, the temperature sensor 29, and other water temperature sensors (not shown). These values are then properly corrected.

At Step 3, an air output temperature (TAO) that is required for achieving the target temperature based on the temperature condition obtained at Step 2 is computed from a formula.

At Step 4, a motor controller voltage for driving the blower 102 is controlled based on a relationship between the necessary air output temperature TAO and a blower air amount (or blower voltage).

At Step 5, an opening degree of the air mix door 104 for achieving the necessary air output temperature TAO is determined based on the necessary air output temperature TAO and the temperature condition obtained at Step 2, in accordance with a formula, and controlled through a servo motor (not shown).

At Step 6, one of blowing modes including a face mode, a foot mode, and a bi-level mode is determined and controlled through a servo motor (not shown). It is determined from the necessary air output TAO based on blowing mode pattern data indicating a relationship between the necessary air output TAO and the blowing mode of the air stream into the cabin.

At Step 7, the electromagnetic clutch 3, the electric motor 6, the capacity control valve 4a, and the like are controlled in a compressor control process described below. The flow chart from Step 1 to Step 7 is repeated at approximately 0.25 seconds per circuit.

Figure 5:
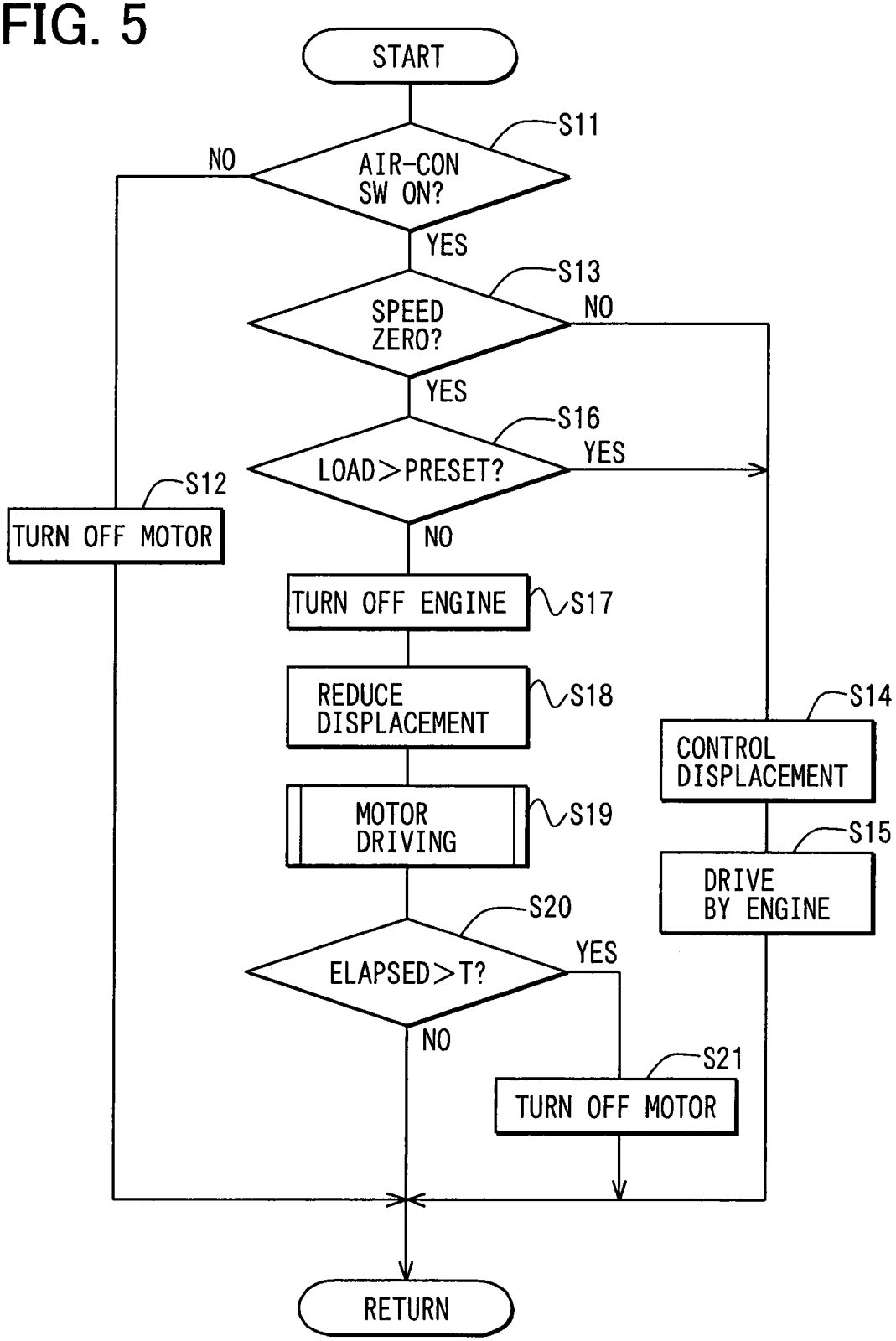
FIG. 5 is a flow diagram explaining compressor controlling in the flow chart of FIG. 3.

In the next place, a compressor control process will be explained with reference to FIG. 5. This process can be executed while the ignition switch 16 is turned on.

At Step 11, it is determined whether the air-conditioning switch 25 is tuned on. When the switch 25 is turned off, it is unnecessary to operate the air-conditioning system 100 and Step 12 is performed. Here, the electric motor 6 is turned off and the electromagnetic clutch 3 is disengaged. The compressor 4 is thereby turned off. When the switch 25 is turned on, Step 13 is performed.

At Step 13, it is determined whether the vehicle speed detected through the vehicle speed sensor 24 is zero. When the speed is determined to be not zero (when the vehicle is traveling), Step 14 is performed.

At Step 14, capacity control for the compressor 4 is executed using the capacity control valve 4a so that the air temperature detected through the temperature sensor 29 can reach the target temperature. The cooling load that is necessary for achieving the target temperature decreases with an increase in the target air temperature. The displacement of the compressor 4 decreases with a decrease in the cooling load. This decreases the load on the engine 1. Thus, the capacity control is executed before the compressor 4 is driven by the engine 1.

At Step 15, under a condition controlled at Step 14, the electromagnetic clutch 3 is engaged, so that the compressor 4 is driven by the engine 1.

By contrast, when the vehicle speed is determined to be zero, Step 16 is performed.

At Step 16, it is determined whether the cooling load is greater than a preset value (whether rapid cooling is necessary). The preset value is positioned between the maximum and the minimum of the selectable cooling capacity of the compressor 4. It is simultaneously determined whether a refrigerant circulating amount is greater than a preset value. For instance, the outside air temperature is extremely high in summer, e.g., more than 30° C., and the inside air temperature is also high, e.g., more than 30° C. In this case, the cooling load will be greater than the preset value.

In the compressor 4 of this embodiment, the cooling load of the compressor 4 is indirectly estimated by detecting the outside and inside air temperatures or the electric current (duty) of the control valves. When the cooling load of the cabin is greater than the preset value, Steps 14 and 15 are performed. The compressor 4 is thereby driven by the engine 1.

When the cooling load is not greater than the preset value, Step 17 is performed.

At Step 17, the engine 1 is turned off and the electromagnetic clutch is disengaged. This situation occurs when the truck arrives at a destination and temporarily stops for loading or unloading or when the truck waits at stop lights. Since the cooling load is not greater than the preset value and there is no need for driving the engine 1, the engine 1 is turned off while the ignition switch 16 is tuned on.

Here, during the loading or unloading work, the engine 1 is turned off, so that exhaust gas does not pollute the atmosphere.

However, when the engine 1 is turned off and the compressor 4 is thereby turned off, the refrigerant does not circulate within the refrigerating circuit 5 and the cooling capacity of the vehicular air-conditioning system 100 becomes zero. Air-conditioning of the cabin thus cannot be executed. When the cooing load is not greater than the preset value, the compressor 4 is consequently driven by activating the electric motor 6.

When the cooling load is not greater than the preset value, the necessary capacity of the compressor 4 is less than the preset value and the circulating amount of the refrigerant is small. As a result, the driving force for the compressor 4 is small, so that the compressor 4 can be driven by the electric motor 6.

By contrast, when the cooling load is greater than the preset value, the necessary capacity of the compressor 4 is not less than the preset value and the circulating amount of the refrigerant is not small. As a result, the driving force for the compressor 4 is large, so that the compressor is driven by the engine 1 even while the vehicle is stopped.

Thus, even a compact electric motor 6 can drive the compressor 4. This improves the mounting flexibility of the electric motor 6. Furthermore, an externally variable displacement type compressor is chosen for the compressor 4. When the cooling load is not greater than the preset value, the electric motor 6 drives the compressor 4. In comparison with a fixed displacement type compressor, the electric motor 6 needs to produce a smaller force when driving a variable displacement type compressor. Consequently, the size of the electric motor 6 when a variable displacement type compressor is employed is smaller than that when a fixed displacement type compressor is used.

At Step 18, low capacity control of the compressor is executed before the electric motor 6 drives the compressor 4. Here, the displacement is forcibly reduced to a minimum level (low capacity state) by controlling the capacity control valve 4a, and then the electric motor 6 is activated. The capacity of the compressor 4 thus becomes small, so that the driving force for the compressor 4 becomes smaller in comparison with a case where the capacity of the compressor 4 is large.

Thus, the capacity of the compressor 4 is decreased at Step 18. Therefore, a large electric motor having large driving force is not required to drive the compressor 4 at Step 19. Furthermore, the size of the electric motor 6 can be reduced and the mounting flexibility of the electric motor 6 is improved. Although it is not shown, the low capacity state under the driving force of the electric motor 6 continues until the engine 1 restarts. In the low capacity state, the number of revolutions of the electric motor 6 remains constant.

Although the refrigerating circuit 5 cannot sufficiently provide the cooling capacity necessary for cooling the cabin, cooling can be continued at some degree. For instance, while the truck stops for the loading/unloading work, a temperature increase in the cabin can be limited. This results in relieving discomfort of the passengers after the loading/unloading work.

At Step 20, it is determined whether elapsed time of driving of the electric motor 6 is longer than a preset time T (e.g., two minutes). When the elapsed time is longer than the preset time T, Step 21 is performed.

At Step 21, the electric motor 6 is turned off to prevent the battery from running out. Alternatively, the electric motor 6 can be turned off by detecting the voltage or capacity of the battery instead of determining the elapsed time of driving.

Incidentally, there may be a case where the engine 1 is turned on for moving the truck even while the compressor 4 is driven by the electric motor 6. However, if the vehicle remains stopped (being at speed of zero) (Step 13: YES) after the engine 1 is turned on, the engine 1 may be shortly turned off at Step 17). Therefore, to solve this problem, the following process is additionally designed. That is, once the ignition switch 16 is turned on, the engine 1 is not turned off at Step S17 for a certain period even when the vehicle remains stopped (Step 13: YES).

Figure 6:
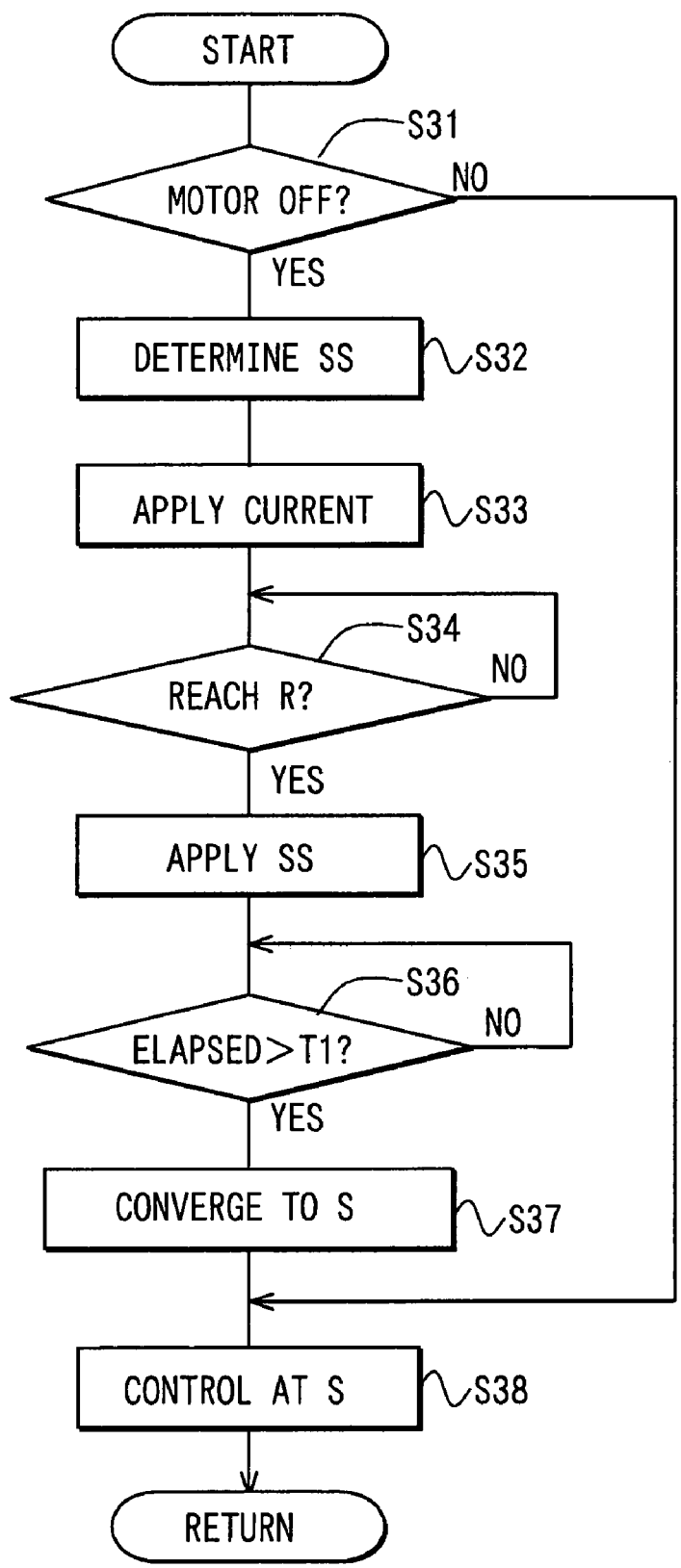
FIG. 6 is a flow diagram explaining processing of controlling in motor driving according to the first embodiment.
Figure 7:
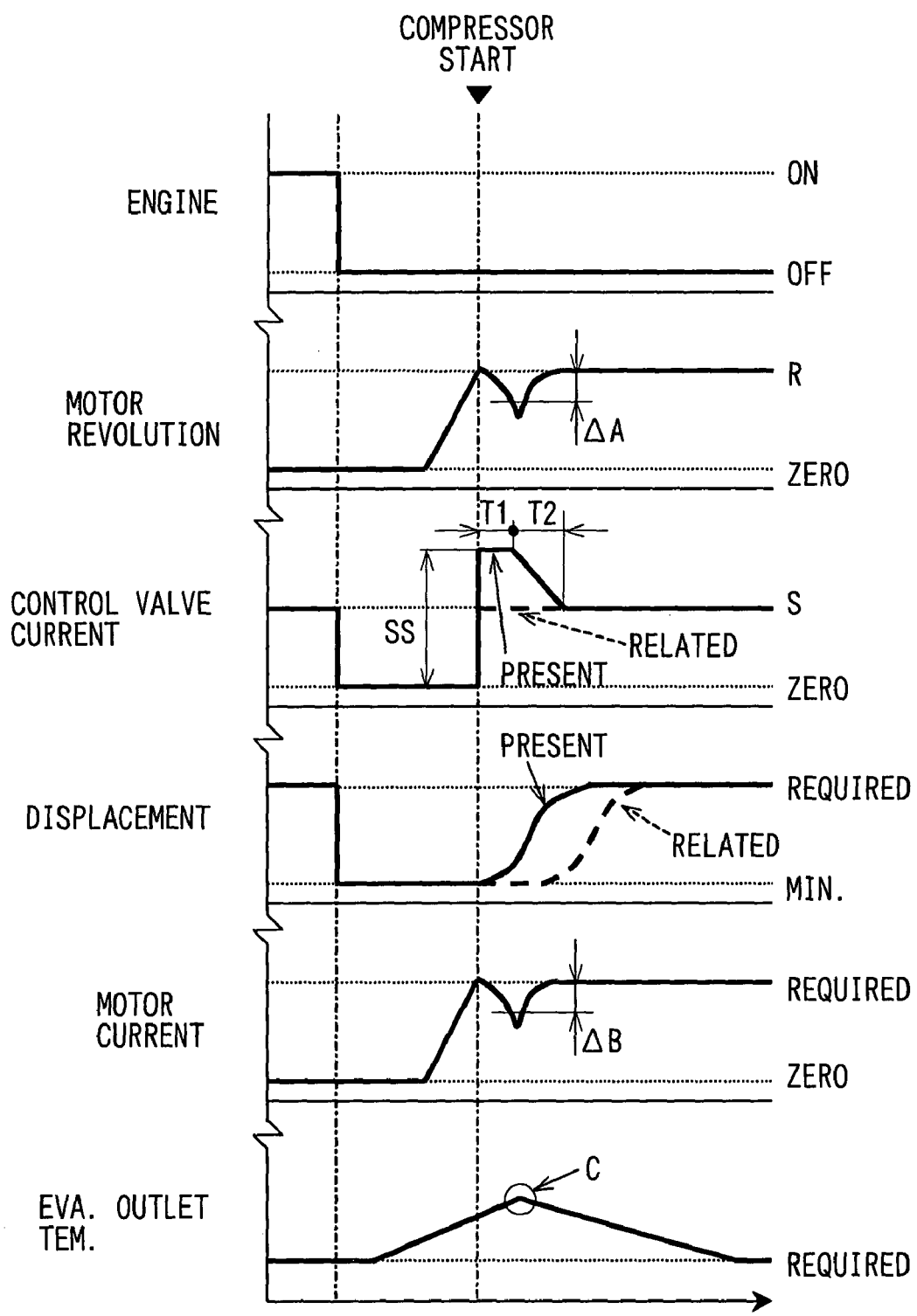
FIG. 7 is a time chart showing operational contents in the motor driving according to the first embodiment.

At Step 19, driving of the motor is executed. The process will be explained with reference to FIGS. 6 and 7. FIG. 6 shows a flow chart for controlling the motor driving according to a first embodiment of the present invention, while FIG. 7 shows a time chart illustrating operation of the motor driving.

At Step 31 in FIG. 6, it is determined whether the electric motor 6 is turned off. When the electric motor 6 is determined to be turned off, Step 32 is performed.

Figure 4:
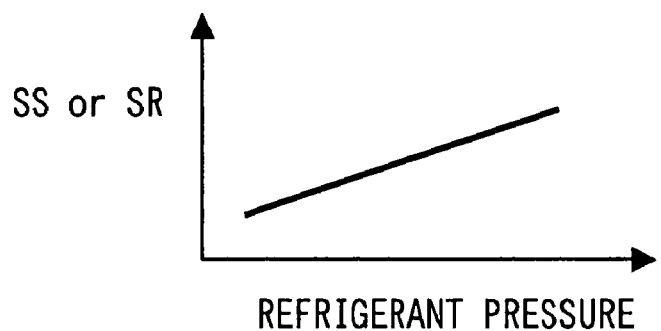
FIG. 4 is a graph showing relationship between refrigerant pressure of higher pressure portion and either of an initial control electric current of a control valve or initial control revolution number of a motor.

At Step 32, an initial control electric current SS of the capacity control valve 4*a* is determined based on the relationship, shown in FIG. 4, based on the refrigerant pressure of the higher pressure portion of the refrigerating circuit 5. The initial control electric current SS is greater than a control electric current S, which is obtained from a state of the refrigerating circuit 5.

In FIG. 4, the relationship between refrigerant pressure of the higher pressure portion and either of the initial control electric current SS or an initial control revolution number SR of the electric motor 6 is shown. The initial control electric current SS and the initial control revolution number SR increase according to an increase in the refrigerant pressure of the higher pressure portion.

At Step 33, electric current is applied to the electric motor 6 for driving the electric motor 6 at a preset number of revolutions R.

At Step 34, it is determined whether the preset number of revolutions R is reached. When the preset number of revolutions R is determined to be reached, Step 35 is performed.

At Step 35, the initial control electric current SS determined at Step 32 is applied to the capacity control valve 4*a*, as shown in FIG. 7. This causes the swash plate 41 to be rapidly inclined.

At Step 36, it is determined whether a preset time T1 elapses. When the preset time T1 has elapsed, Step 37 is performed.

At Step 37, the electric current of the capacity control valve 4*a* is converged, at a preset time T2, to the control electric current S that is obtained from the state of the refrigerating circuit 5.

At Step 38, the electric current is controlled to remain at the control electric current S. Hereafter, when the electric motor 6 is determined to be on at Step 31, Step 38 is performed, where the electric current of the capacity control valve 4*a* is repeatedly controlled to remain at the control electric current S.

Features of this embodiment will be described. In the swash-plate type externally variable displacement compressor of this embodiment, once the displacement starts to recover by virtue of inclination of the swash plate, force is apt to be applied for the displacement to increase. This tendency is utilized in this embodiment. The initial control electric current SS is greater than a control electric current S that is obtained from a state of the refrigerating circuit 5. The initial control electric current SS is applied as a trigger for inclination of the swash plate. When the compressor 4 starts being driven by the electric motor 6, the displacement of the compressor 4 can be thereby rapidly recovered.

Furthermore, the pressure sensor 26 is provided for detecting the refrigerant pressure in the higher pressure portion of the refrigerating circuit 5. According to the refrigerant pressure in the higher pressure portion of the circuit 5, the initial control electric current SS is varied. The initial control electric current SS is thereby set based on the cooling load of the refrigerating circuit 5.

After the compressor 4 starts being driven by the electric motor 6, the initial control electric current SS continues to be used as a target only for the preset time T1. If the swash plate starts being inclined and the initial control electric current SS still continues to be used at the target more than the preset time T1, excessive cooling or wasteful power consumption may occur. The preset time T1 is suitable just for triggering the swash plate to start being inclined.

As another aspect, the revolution number sensor 27 is provided for detecting the number of revolutions of the electric motor 6. After the compressor 4 starts being driven by the electric motor 6, a decrease $\Delta A$ from a preset revolution number R is detected, as shown in FIG. 7. By detecting the decrease $\Delta A$, the electric current of the capacity control valve 4*a* can start to converge from the initial control electric current SS to the control electric current S. The decrease of the number of revolutions of the motor 6 means that the swash plate 41 has started to be inclined. This structure can also restrict excessive cooling or wasteful power consumption.

As another aspect, the electric current sensor 28 is provided for detecting the electric current for driving the electric motor 6. After the compressor 4 starts being driven by the electric motor 6, a decrease $\Delta B$ from a required value is detected as shown in FIG. 7. By detecting the decrease $\Delta B$, the electric current of the capacity control valve 4*a* can start to converge from the initial control electric current SS to the control electric current S. The decrease of the electric current of the motor 6 also means that the swash plate 41 has started to be inclined. This structure can also restrict excessive cooling or wasteful power consumption.

As yet another aspect, the temperature sensor 29 is provided for detecting the temperature of air (at the outlet of the evaporator 14) just after the air passes through the evaporator 14. After the compressor 4 starts being driven by the electric motor 6, a shifting point C at which the air temperature that has been increasing starts to decrease is detected as shown in FIG. 7. By detecting the shifting point C, the electric current of the capacity control valve 4*a* can start to converge from the initial control electric current SS to the control electric current S. Since the displacement of the compressor 4 is recovered, the increasing air temperature starts to again decrease and the shifting point C is detected. This structure can also restrict excessive cooling or wasteful power consumption.

The electric current of the capacity control valve 4*a* converges from the initial control electric current SS to the control electric current S at the preset time T2. This enables a gradual shift to usual control, so that a worsening of cooling or discomfort is prevented. Furthermore, providing the above control device in the compressor 4 enables the use of a swash-plate type externally variable displacement compressor, which rapidly recovers displacement when the compressor 4 starts being driven by the motor 6.

Second Embodiment

A second embodiment will be explained with reference to FIGS. 8 and 9. The second embodiment is different from the first embodiment only in the motor control of the ECU 15.

Figure 8:
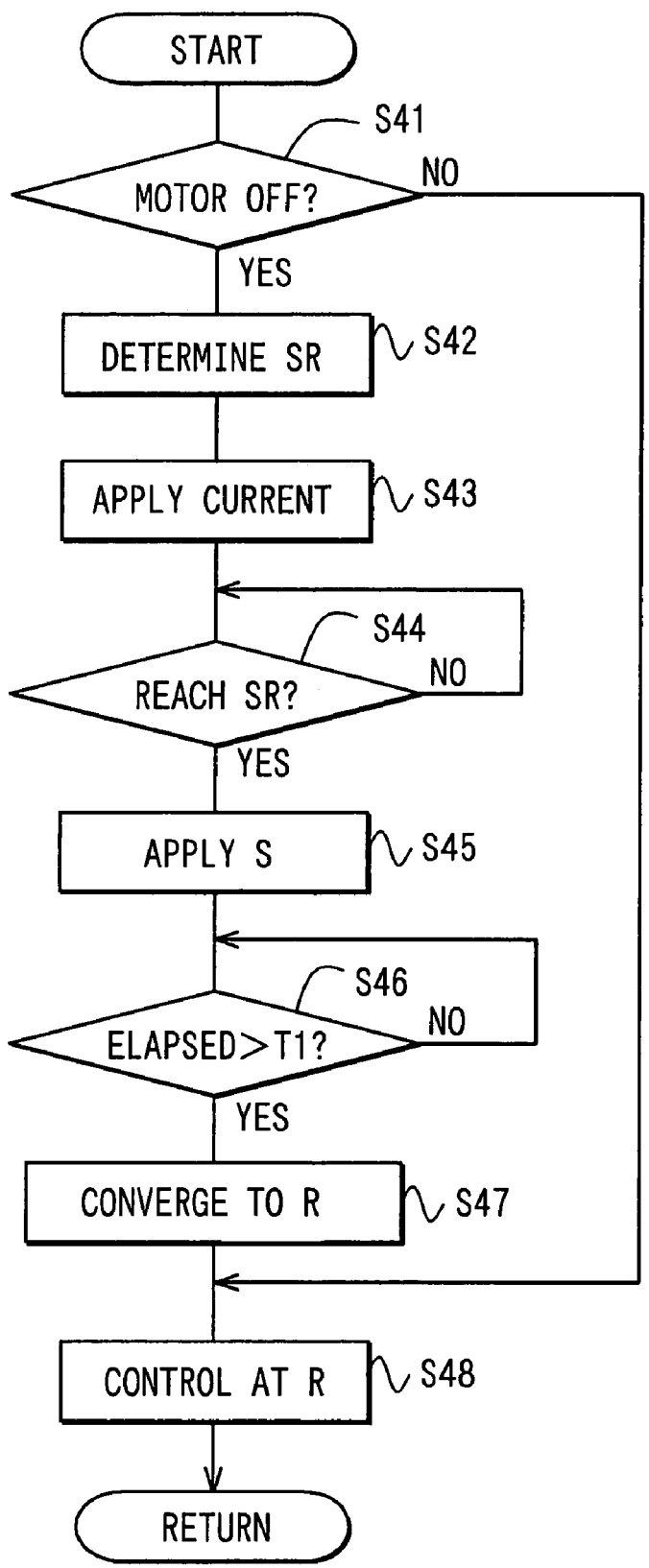
FIG. 8 is a flow diagram explaining processing of controlling in motor driving according to a second embodiment.

At Step 41 in FIG. 8, it is determined whether the electric motor 6 is turned off. When the electric motor 6 is determined to be turned off, Step 42 is performed.

At Step 42, an initial control number of revolutions SR of the electric motor 6 is determined based on the relationship based on the refrigerant pressure of the higher pressure portion shown in FIG. 4. The initial control number of revolutions SR is greater than the preset number of revolutions R.

At Step 43, electric current is applied to the electric motor 6 for driving the electric motor 6 at the initial control number of revolutions SR determined at Step 42.

At Step 44, it is determined whether the initial control number of revolutions SR is reached. When the initial control number of revolutions SR is determined to be reached, Step 45 is performed.

Figure 9:
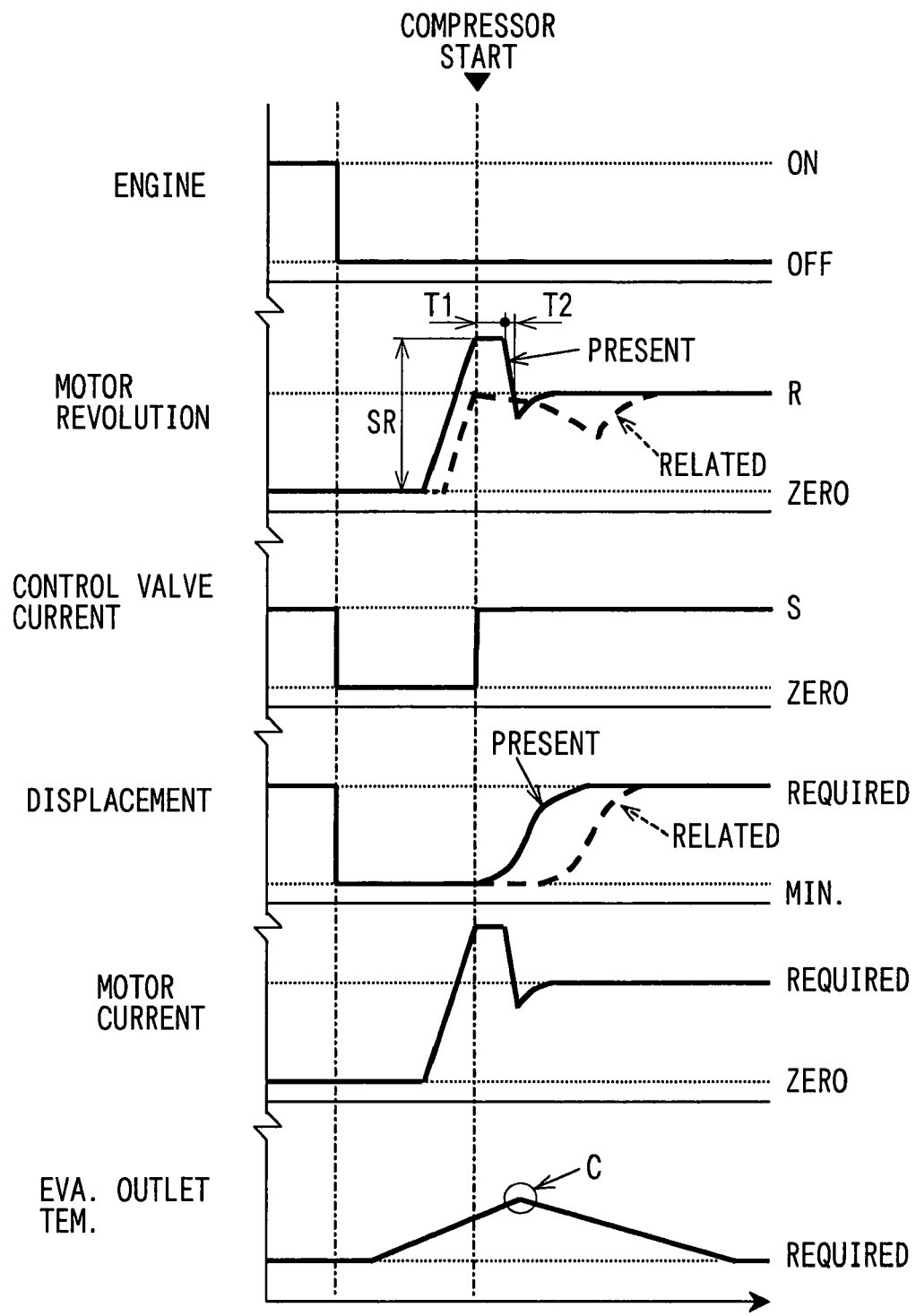
FIG. 9 is a time chart showing operational contents in the motor driving according to the second embodiment.

At Step 45, the control electric current S that is obtained from a state of the refrigerating circuit is applied to the capacity control valve 4*a*, as shown in FIG. 9. This causes the swash plate 41 to be rapidly inclined.

At Step 46, it is determined whether a preset time T1 has elapsed. When the preset time T1 has elapsed, the Step 47 is performed.

At Step 47, the number of revolutions of the electric motor 6 is converged, at a preset time T2, to the preset number of revolutions R from the initial control number of revolutions SR.

At Step 48, the number of revolutions is controlled to remain at the preset number of revolutions R. Hereafter, when the electric motor 6 is determined to be on at Step 41, Step 48 is performed, where the revolution number is repeatedly controlled to remain at the preset number of revolutions R.

Features of this embodiment will be described. As explained in the first embodiment, in the swash-plate type externally variable displacement compressor of this embodiment, once the displacement starts to recover by virtue of inclination of the swash plate, force is apt to be applied for the displacement to increase. This tendency can be also utilized in this embodiment. The initial control number of revolutions SR is greater than the preset number of revolutions R. The initial control number of revolutions SR is used as a trigger for inclination of the swash plate. Since inertia of the swash plate is increased, the displacement of the compressor 4 can be rapidly recovered when the compressor 4 starts being driven by the electric motor 6.

Furthermore, the pressure sensor 26 is provided for detecting the refrigerant pressure in the higher pressure portion of the refrigerating circuit 5. According to the refrigerant pressure in the higher pressure portion of the circuit 5, the initial control number of revolutions SR is varied. The initial control number of revolutions SR is thereby set based on the cooling load of the refrigerating circuit 5.

After the compressor 4 starts being driven by the electric motor 6, the initial control number of revolutions SR continues to be used as a target only for the preset time T1. If the swash plate starts being inclined and the initial control number of revolutions SR still continues to be used at the target more than the preset time T1, excessive cooling or wasteful power consumption may also occur. The preset time T1 is suitable just for triggering inclination of the swash plate.

As another aspect, the temperature sensor 29 is also provided for detecting the temperature of air (at the outlet of the evaporator 14) just after the air passes through the evaporator 14, as explained above in the discussion of the first embodiment. After the compressor 4 starts being driven by the electric motor 6, a shifting point C at which the air temperature that has been increasing starts to decrease is detected in FIG. 9. By detecting the shifting point C, the number of revolutions can start to converge from the initial control number of revolutions SR to the preset number of revolutions R. This structure can also restrict excessive cooling or wasteful power consumption.

The number of revolutions of the electric motor 6 converges from the initial control number of revolutions SR to the preset number of revolutions R at the preset time T2. This enables a gradual shift to usual control, so that worsening of cooling or discomfort is prevented. Furthermore, providing the above control device in the compressor 4 enables the use of a swash-plate type externally variable displacement compressor that rapidly recovers displacement when the compressor 4 starts being driven by the motor 6.

Modification

The first and second embodiments can be modified as explained below.

Although the initial control electric current SS and the initial control number of revolutions SR are varied based on the refrigerant pressure of the higher pressure portion, these initial control values can be constant values.

The electric current of the capacity control valve 4*a* converges from the initial control electric current SS to the control electric current S at the preset time T2. The number of revolutions of the electric motor 6 converges from the initial control number of revolutions SR to the preset number of revolutions R at the preset time T2. However, a gradual shift that needs the preset time T2 is not always necessary. An instant shift that does not need a certain period can be used instead of the gradual shift.

While the compressor 4 is driven by the motor 6, the number of revolutions of the electric motor 6 remains constant. However, the number of revolutions can be variable according to the cooling load. In the above hybrid compressor, the compression mechanism 4 and the electric motor 6 are integrally assembled. However, the compression mechanism can be a simple body. In this case, a rotation shaft of the compression mechanism is provided with an electromagnetic clutch and a pulley. The pulley is connected separately with an engine and an electric motor through belts, so that the compression mechanism is driven selectively by the engine or the electric motor.

The refrigerating circuit 5 is for cooling the cabin of the vehicle. However, the circuit can be for cooling a refrigerator or a freezer. In this case, cooling of the refrigerator or the freezer can be continued during the loading/unloading work in the truck.

The present invention can be directed to a so-called hybrid vehicle that travels by a driving source of either an engine or an electric motor. It can be also directed to a vehicle having an engine dedicated for generating electricity. In this vehicle, an electric motor that is driven by the electricity generated by the engine is used for moving the vehicle. Furthermore, the present invention can be directed to not only a vehicle but also a stationary refrigerating device driven by an engine.

It will be obvious to those skilled in the art that various changes may be made in the above-described embodiments of the present invention. However, the scope of the present invention should be determined by the following claims.

What is claimed is:

1. A control device in a hybrid compressor that is within a refrigerating circuit and driven by one of an engine and an electric motor, wherein the hybrid compressor includes a compression mechanism that is driven by rotation of a swash plate, and an inclination angle of the swash plate is varied by a capacity controller that is externally controlled, the control device comprising a controller for
  (i) operating the hybrid compressor, after the engine stops, in a low capacity state, in which a displacement of the hybrid compressor is decreased to a second displacement from a first displacement that is generated by the engine before the engine is stopped,
  (ii) then operating the hybrid compressor by setting the capacity controller to a first control value to trigger the swash plate to be rapidly inclined when the hybrid compressor starts being driven by the electric motor, and
  (iii) then operating the hybrid compressor by setting the capacity controller to a second control value after the controller has operated the hybrid compressor based on the first control value, wherein the first control value increases the displacement more than the second control value does, and the second control value is obtained from a status of the refrigerating circuit.

2. A control device in a hybrid compressor that is within a refrigerating circuit and driven by one of an engine and an electric motor, wherein the hybrid compressor includes a compression mechanism that is driven by rotation of a swash plate, wherein an inclination angle of the swash plate is varied by a capacity controller that is externally controlled, and wherein the control device comprises a controller for
  (i) operating the hybrid compressor, after the engine stops, in a low capacity state, in which a displacement of the hybrid compressor is decreased to a second displacement from a first displacement that is generated by the engine before the engine is stopped,
  (ii) then operating the hybrid compressor by driving the electric motor at a first number of revolutions to thereby trigger the swash plate to be rapidly inclined when the hybrid compressor starts being driven by the electric motor, and
  (iii) then operating the hybrid compressor by driving the electric motor at a second number of revolutions after the controller has operated the hybrid compressor based on the first number of revolutions and the displacement is increased from the second displacement in the low capacity state, wherein the first number of revolutions is greater than the second number of revolutions.

3. The control device according to claim 1, further comprising:
  a pressure detector for detecting refrigerant pressure in a higher portion of the refrigerating circuit,
  wherein the first control value varies according to the refrigerant pressure detected by the pressure detector.

4. The control device according to claim 2, further comprising a pressure detector for detecting refrigerant pressure in a higher pressure portion of the refrigerating circuit, wherein the first number of revolutions varies according to the refrigerant pressure detected by the pressure detector.

5. The control device according to claim 1, wherein the controller operates the hybrid compressor based on the first control value for a certain period after the hybrid compressor starts being driven by the electric motor.

6. The control device according to claim 1, further comprising a revolution number detector for detecting a number of revolutions of the electric motor, wherein the controller operates the hybrid compressor until the revolution number detector detects a certain decrease in the number of revolutions of the electric motor, after the hybrid compressor starts being driven by the electric motor.

7. The control device according to claim 1, further comprising an electric current detector for detecting an electric current of the electric motor, wherein the controller operates the hybrid compressor until the electric current detector detects a given decrease in the electric current of the electric motor, after the hybrid compressor starts being driven by the electric motor.

8. The control device according to claim 1, further comprising an air temperature detector for detecting a temperature of air that has passed through an evaporator of the refrigerating circuit, wherein the controller operates the hybrid compressor until the air temperature detector detects a decrease in the temperature of air that has passed through the evaporator.

9. The control device according to claim 1, wherein the controller operates the hybrid compressor for a given period after the hybrid compressor is controlled based on the first control value and before the hybrid compressor is operated based on the second control value by setting the capacity controller at a variable control value that converges, for the given period, from the first control value to the second control value.

10. The control device according to claim 2, wherein the controller operates the hybrid compressor for a given period after the hybrid compressor is controlled based on the first number of revolutions and before the hybrid compressor is operated based on the second number of revolutions, by driving the electric motor at a variable number of revolutions that converges, for the given period, from the first number of revolutions to the second number of revolutions.

11. A hybrid compressor that is within a refrigerating circuit and driven by one of an engine and an electric motor, comprising:
  a swash plate rotated by one of the engine and the electric motor;
  a compression mechanism driven by rotation of the swash plate;
  a capacity controller that is externally controlled and varies an inclination angle of the swash plate; and
  a controller for
    (i) operating the hybrid compressor, after the engine stops, in a low capacity state, in which a displacement of the hybrid compressor is decreased to a second displacement from a first displacement that is generated by the engine before the engine is stopped,
    (ii) then operating the compression mechanism by setting the capacity controller to a first control value to trigger the swash plate to be rapidly inclined when the compression mechanism starts being driven by the electric motor, and
    (iii) then operating the compression mechanism by setting the capacity controller to a second control value after the controller has operated the compression mechanism based on the first control value, wherein the first control value increases the displacement more than the second control value does, and the second control value is obtained from a status of the refrigerating circuit.

12. A hybrid compressor that is within a refrigerating circuit and driven by one of an engine and an electric motor, comprising:
  a swash plate rotated by one of the engine and the electric motor;
  a compression mechanism driven by rotation of the swash plate;

a capacity controller that is externally controlled and varies an inclination angle of the swash plate; and a controller for
(i) operating the hybrid compressor, after the engine stops, in a low capacity state, in which a displacement of the hybrid compressor is decreased to a second displacement from a first displacement that is generated by the engine before the engine is stopped,
(ii) then operating the compression mechanism by driving the electric motor at a first number of revolutions to trigger the swash plate to be rapidly inclined when the compression mechanism starts being driven by the electric motor, and
(iii) then operating the compression mechanism by driving the electric motor at a second number of revolutions after the controller has operated the compression mechanism based on the first number of revolutions and the displacement is increased from the second displacement in the low capacity state, wherein the first number of revolutions is greater than the second number of revolutions.

13. A control device in a hybrid compressor that is within a refrigerating circuit and driven by one of an engine and an electric motor, the hybrid compressor includes a compression mechanism that is driven by rotation of a swash plate, and an inclination angle of the swash plate is varied by a capacity control valve that is externally controlled, wherein the control device comprises a controller that
(i) operates the hybrid compressor, after the engine stops, in a low capacity state, in which a displacement of the hybrid compressor is decreased to a second displacement from a first displacement that is generated by the engine before the engine is stopped,
(ii) then operates the hybrid compressor at a first control value to trigger the swash plate to be rapidly inclined when the hybrid compressor starts being driven by the electric motor and
(iii) then operates the hybrid compressor at a second control value after the controller has operated the hybrid compressor based on the first control value and the displacement is increased from the second displacement in the low capacity state, wherein the first control value increases the displacement more than the second control value does, and wherein the second control value is obtained from a status of the refrigerating circuit.

14. The control device according to claim 13,
wherein the control device includes the capacity control valve, and
wherein the first control value includes a first electric current applied to the capacity control valve while the second control value includes a second electric current applied to the capacity control valve.

15. The control device according to claim 13,
wherein the control device includes the electric motor, and
wherein the first control value includes a first number of revolutions of the electric motor while the second control value includes a second number of revolutions of the electric motor.

16. The control device according to claim 2, wherein the controller operates the hybrid compressor based on the first number of revolutions for a certain period after the hybrid compressor starts being driven by the electric motor.

17. A control apparatus for a hybrid compressor that is within a refrigerating circuit, wherein the hybrid compressor is driven by one of an engine and an electric motor, and a compression mechanism of the hybrid compressor is driven by rotation of a swash plate, and an inclination angle of the swash plate is varied by an externally controlled capacity controller, and wherein the control apparatus comprises a control means for
(i) operating the hybrid compressor, after the engine stops, in a low capacity state in which a displacement of the hybrid compressor is decreased to a low capacity displacement which is smaller than the displacement that exists before the engine is stopped, and
(ii) then operating the hybrid compressor by setting the capacity controller to an initial control value, which increases the displacement more than a given control value based on a state of the refrigerating circuit, for triggering the swash plate to rapidly incline when the electric motor starts driving the hybrid compressor, and before the capacity controller is set to the given control value, the capacity controller is set to the initial control value.

18. A control apparatus for a hybrid compressor that is within a refrigerating circuit, wherein the hybrid compressor is driven by one of an engine and an electric motor, a compression mechanism of the hybrid compressor is driven by rotation of a swash plate, and an inclination angle of the swash plate is varied by an externally controlled capacity controller, and wherein the control apparatus comprises control means for
(i) operating the hybrid compressor, after the engine stops, in a low capacity state, in which a displacement of the hybrid compressor is decreased to a low capacity displacement, which is smaller than the displacement that exists before the engine is stopped, and
(ii) then operating the hybrid compressor by driving the electric motor at an initial number of revolutions, which is greater than a preset number of revolutions, for causing the swash plate to rapidly incline when the electric motor starts driving the hybrid compressor, and before the motor is driven using the preset number of revolutions, the motor is driven at the initial number of revolutions.

19. The control device according to claim 2, further comprising an air temperature detector for detecting a temperature of air that has passed through an evaporator of the refrigerating circuit, wherein the controller operates the hybrid compressor until the air temperature detector detects a decrease in the temperature of air that has passed through the evaporator.

20. The control device according to claim 1, wherein
the controller operates the hybrid compressor in the low capacity state after the engine stops by setting the capacity controller to a minimum control value, which decreases a displacement to the second displacement, which is a minimum displacement of the hybrid compressor, and
application of electric current to the electric motor is started when the hybrid compressor is in the low capacity state before the hybrid compressor starts being driven by the electric motor.

21. The control device according to claim 2, wherein
the controller operates the hybrid compressor in the low capacity state after the engine stops by setting the capacity controller to a minimum control value, which decreases a displacement to the second displacement, which is a minimum displacement of the hybrid compressor, and
application of electric current to the electric motor is started when the hybrid compressor is in the low capacity state before the hybrid compressor starts being driven by the electric motor.

22. The hybrid compressor according to claim 11, wherein the controller operates the compression mechanism in the low capacity state after the engine stops by setting the capacity controller to a minimum control value, which decreases a displacement to the second displacement, which is a minimum displacement of the hybrid compressor, and application of electric current to the electric motor is started when the compression mechanism is in the low capacity state before the compression mechanism starts being driven by the electric motor.

23. The hybrid compressor according to claim 12, wherein the controller operates the compression mechanism in the low capacity state after the engine stops by setting the capacity controller to a minimum control value, which decreases a displacement to the second displacement, which is a minimum displacement of the compression mechanism, and application of electric current to the electric motor is started when the compression mechanism is in the low capacity state before the compression mechanism starts being driven by the electric motor.

24. The control device compressor according to claim 13, wherein the controller operates the hybrid compressor in the low capacity state after the engine stops by setting the capacity controller to a minimum control value, which decreases a displacement to the second displacement, which is a minimum displacement of the hybrid compressor, and application of electric current to the electric motor is started when the hybrid compressor is in the low capacity state before the hybrid compressor starts being driven by the electric motor.

25. The control apparatus according to claim 17, wherein the controller operates the hybrid compressor in the low capacity state after the engine stops by setting the capacity controller to a minimum control value, which decreases a displacement to the second displacement, which is a minimum displacement of the hybrid compressor, and application of electric current to the electric motor is started when the hybrid compressor is in the low capacity state before the hybrid compressor starts being driven by the electric motor.

26. The control apparatus according to claim 18, wherein the controller operates the hybrid compressor in the low capacity state after the engine stops by setting the capacity controller to a minimum control value, which decreases a displacement to the second displacement, which is a minimum displacement of the hybrid compressor, and application of electric current to the electric motor is started when the hybrid compressor is in the low capacity state before the hybrid compressor starts being driven by the electric motor.

* * * * *